UNITED STATES PATENT OFFICE.

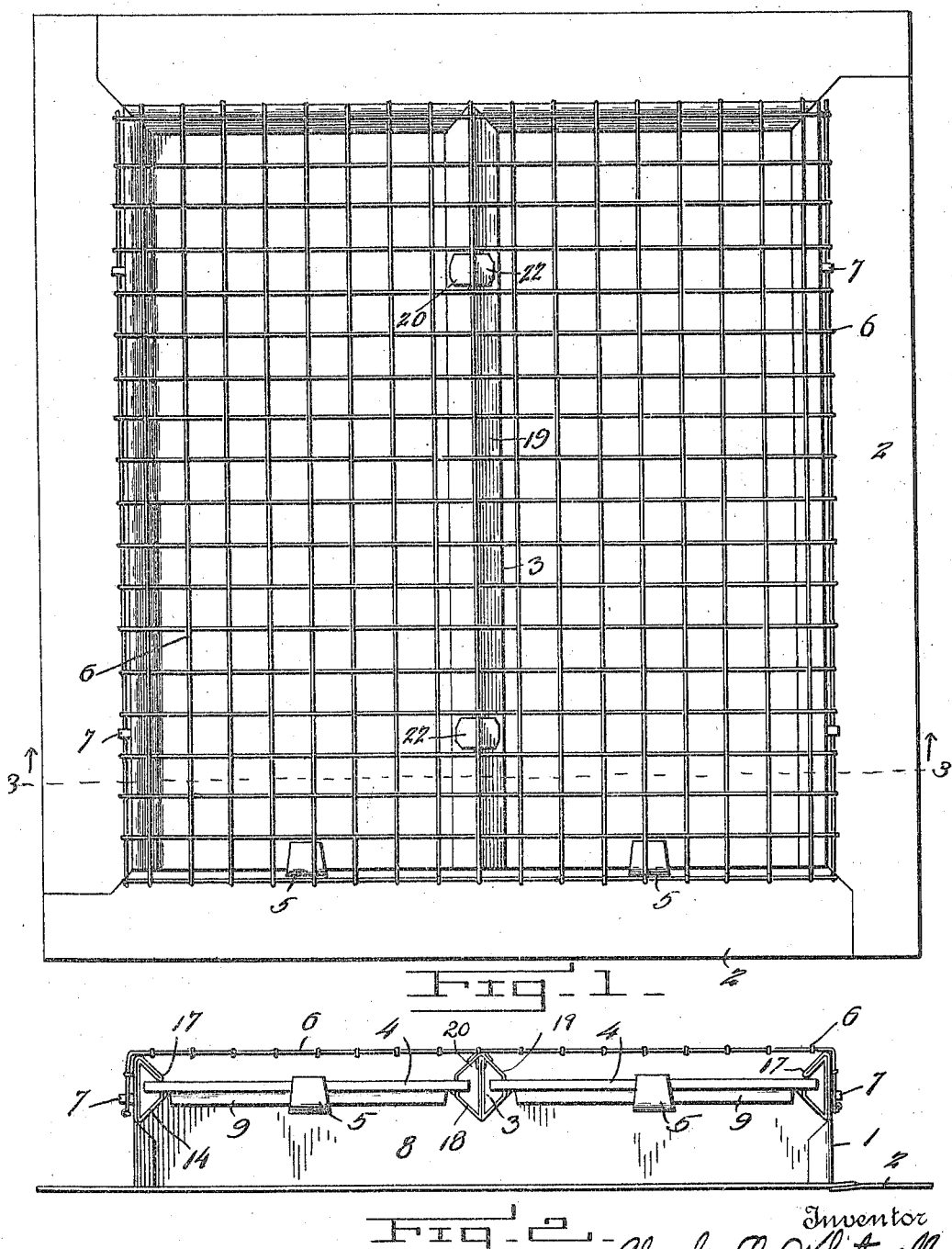

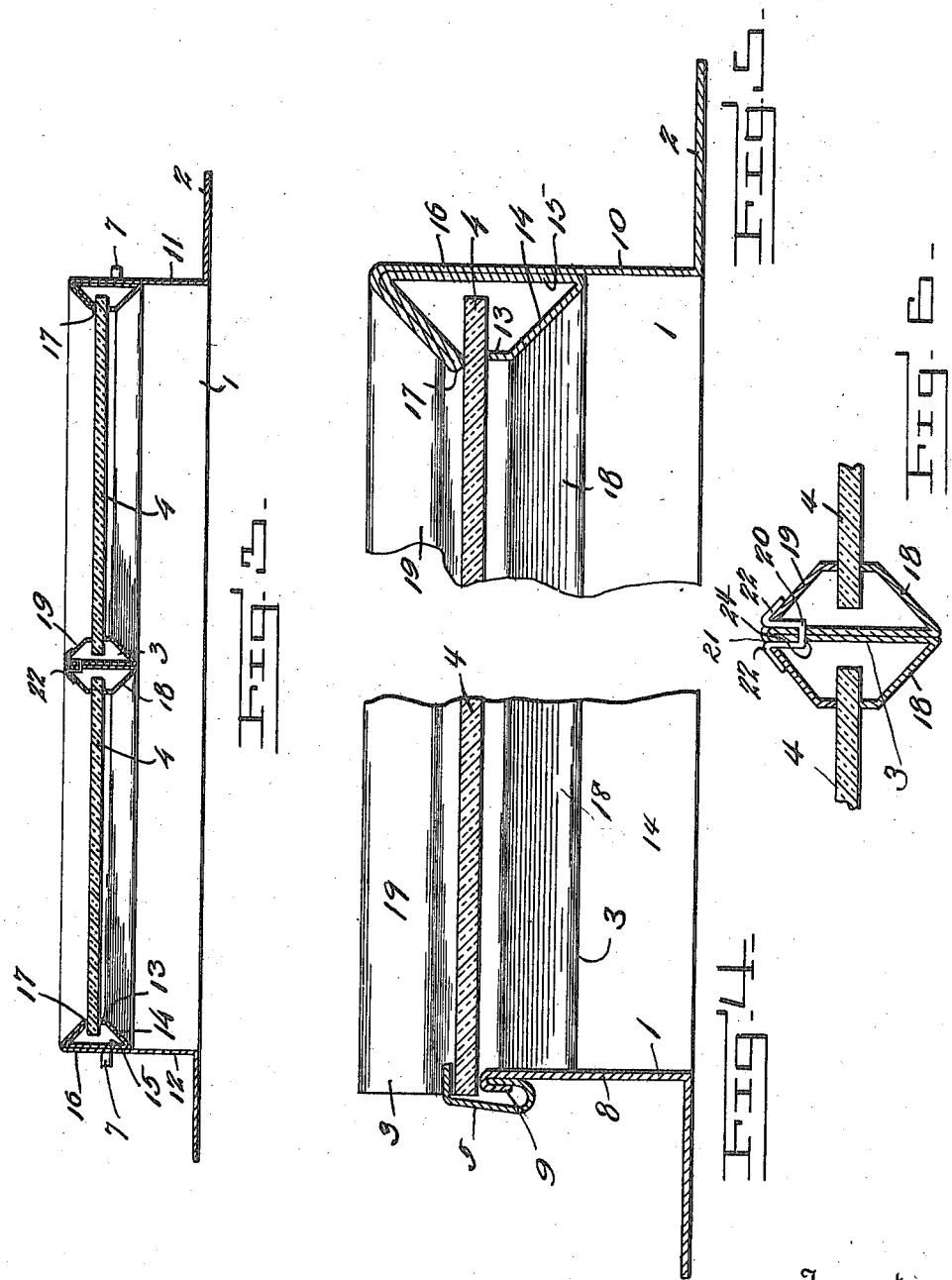

CHARLES O. WHITNELL, OF KINGSLEY, IOWA.

SKYLIGHT.

1,233,530.   Specification of Letters Patent.   Patented July 17, 1917.

Application filed April 24, 1916. Serial No. 93,154.

*To all whom it may concern:*

Be it known that I, CHARLES O. WHITNELL, a citizen of the United States, residing at Kingsley, in the county of Plymouth and State of Iowa, have invented new and useful Improvements in Skylights, of which the following is a specification.

My present invention pertains to skylights and analogous structures; and it contemplates the provision of a skylight designed more particularly for use on the inclined roof of a hog house and embodying simple and strong means for holding and protecting the glasses in such manner that leakage is precluded and yet either glass may be expeditiously and easily removed when broken and as readily replaced with a new glass.

Other objects and advantageous features of the invention will be fully understood from the following description and claim when the same are read in connection with the drawings, accompanying and forming part of this specification, in which:

Figure 1 is a plan view of my novel skylight.

Fig. 2 is an elevation showing the end of the skylight at which the glasses are inserted.

Fig. 3 is a transverse section taken in the plane indicated by the line 3—3 of Fig. 1, looking in the direction indicated by arrow.

Fig. 4 is a fragmentary section taken longitudinally through one of the pliable glass retainers.

Fig. 5 is a detailed longitudinal section taken through the keeper for the ends of the glasses remote from the pliable retainers, and Fig. 6 is an enlarged detail section of the intermediate construction.

Similar numerals of reference designate corresponding parts in all of the views of the drawings.

My novel skylight comprises an upstanding rectangular frame 1, and a flange 2 which extends outwardly from the frame 1 and is designed to rest on the side roof of the house. The skylight also comprises a longitudinal central support 3, a keeper for the glasses 4, mounted and secured on said support, pliable retainers 5 for the glasses, a guard 6 of woven wire or other suitable reticulated and pliable material, arranged over the glasses 4 and overhanging the sides of the frame 1, and lugs 7 on which said guard is detachably secured.

The end wall 8 of the frame 1 that is adjacent to the retainers 5 is provided at its upper edge with a lip 9 on which the glasses rest. The other end wall 10 of the frame 1 as well as the side walls 11 and 12 thereof are also provided with rests 13 for the glasses 4; the said rests 13 being each provided with an upwardly and inwardly reaching portion 14 the upper edge of which is opposed to the underside of one glass. The said portions 14 merge at their lower edges into the inner layers 15 of the upright side walls and one end wall of the frame 1, and from said inner layers 15 and outer layers 16 inwardly and downwardly extending loops 17 extend; said loops resting above the glasses 4 and serving as keepers therefor. By virtue of this construction the side walls and one end wall of the upstanding frame 1 are rendered stiff and strong and at the same time are provided with the looped keepers 17 under which the glasses are shoved precedent to the bending of the pliable retainers 5 against the ends of the glasses to secure the same in position.

The longitudinal central support 3 is of sheet-metal and loop-shaped. It extends upwardly between the inner longitudinal edges of the glasses 4, and is provided at its lower edge with outwardly and upwardly reaching flanges 18. These rest in recesses in the end walls of the frame 1 and are soldered or otherwise secured to said end walls. They also extend at either side of the space between the inner longitudinal edges of the glasses. Consequently, said flanges are adapted to support the inner edge portions of the glasses and at the same time form troughs to receive any water that may find its way between said edges; the said troughs being open at one end as shown in Fig. 2 for the escape of water.

The keeper hereinbefore referred to as mounted on the support 3 is numbered 19. Said keeper is formed of sheet-metal, is arranged to overhang the inner edge portions of the glasses, and is secured in position by metallic straps 20 which are passed through transverse apertures in the loop-shaped support 3 and are carried through apertures 21 in the keeper 19 and have their end portions bent over on said keeper as indicated by 22 in Fig. 1.

The guard 6 of reticulated material is secured in position by bending it against the sides of the frame 1 so that certain of its interstices receive the lugs 7, as illustrated.

The flange 2 is preferably integral with the frame 1 as illustrated, though it may be fixed with respect to said frame in any other approved manner without involving departure from the scope of my claim.

It will be gathered from the foregoing that my novel skylight is simple and strong in construction; also, that the glasses 4 are strongly secured in position and protected against injury or casual displacement, and that the joints with the glasses are broken in such manner that leakage is precluded. It will further be understood that when it is desirable for any reason to remove the glasses the same may be readily accomplished by bending the retainers 5 downwardly and then withdrawing the glasses through the open end of the frame 1.

Having described my invention what I claim and desire to secure by Letters-Patent, is:

A skylight comprising an upstanding rectangular frame having a plurality of walls each of which is made up of an outer sheet-metal layer and an inner sheet-metal layer arranged against and parallel to said outer layer, and is provided with a downwardly and inwardly reaching loop integral with said layers and a flange integral with and extending upwardly and inwardly from the lower edge of the inner layer; said frame also having a wall on which is a depending lip and pliable retainers, the latter being interposed and secured at one end between the lip and the major portion of the wall; glass interposed between said loops and flanges of the walls and disposed below the lower edges of three of the walls and on the remaining lip-bearing wall and secured in position by said retainers, and a guard of reticulated material secured on the frame and resting on the upper edges of the three first-named walls thereof.

In testimony whereof I have hereunto set my hand in presence of two subscribing witnesses.

CHARLES O. WHITNELL.

Witnesses:
 JOHN B. PHELPS,
 R. E. HESS.

Copies of this patent may be obtained for five cents each, by addressing the "Commissioner of Patents, Washington, D. C."